United States Patent [19]

Fishbaugh

[11] 4,391,436
[45] Jul. 5, 1983

[54] RESILIENT MOUNTING
[75] Inventor: Byron L. Fishbaugh, St. Marys, Ohio
[73] Assignee: The Goodyear Tire & Rubber Company, Akron, Ohio
[21] Appl. No.: 286,399
[22] Filed: Jul. 23, 1981
[51] Int. Cl.³ .............................................. F16F 3/08
[52] U.S. Cl. ............................... 267/141.1; 267/140.2
[58] Field of Search .................. 267/140, 140.2, 140.3, 267/141.1, 141.2, 141.4, 141.5

[56] References Cited
U.S. PATENT DOCUMENTS 2,457,058 12/1948 Markowitz ..................... 267/140.3
3,035,799 5/1962 Peirce ............................ 267/140.3

Primary Examiner—Duane A. Reger
Attorney, Agent, or Firm—R. P. Yaist

[57] ABSTRACT

A resilient mounting of elastomeric material includes first and second insulators adapted for placement on opposite sides of the mounting surface. A spacer includes an elongated cylindrical portion and at one end a perpendicularly extending flat flange. The spacer is forcibly fitted into the first insulator thereby radially compressing the elastomeric material of the lower portion of the first insulator between the cylindrical portion of the spacer and the tubular portion of a metallic annulus which is bonded to the exterior of the first insulator. Upon installation, the mount is pre-compressed in both the axial and radial directions.

8 Claims, 5 Drawing Figures

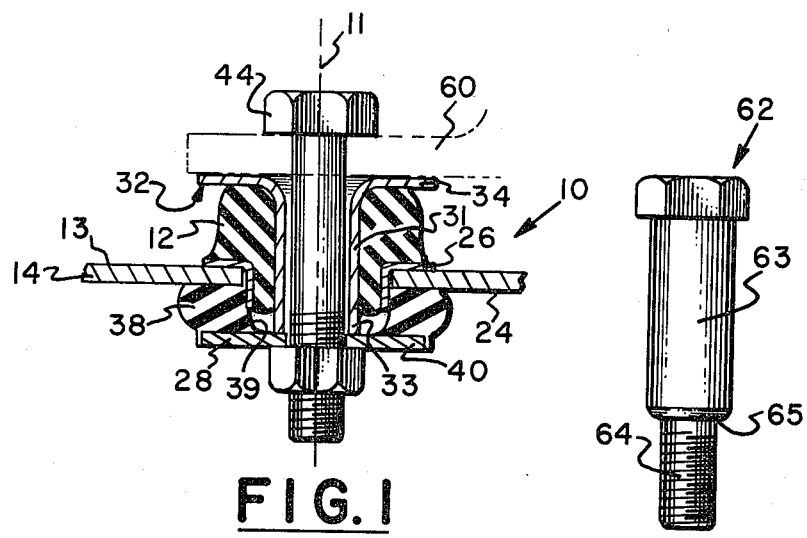
FIG. 1
FIG. 5
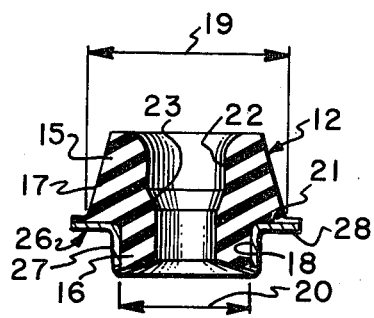
FIG. 2
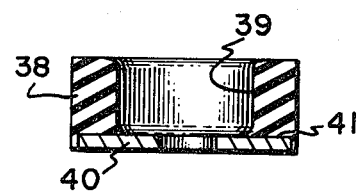
FIG. 3
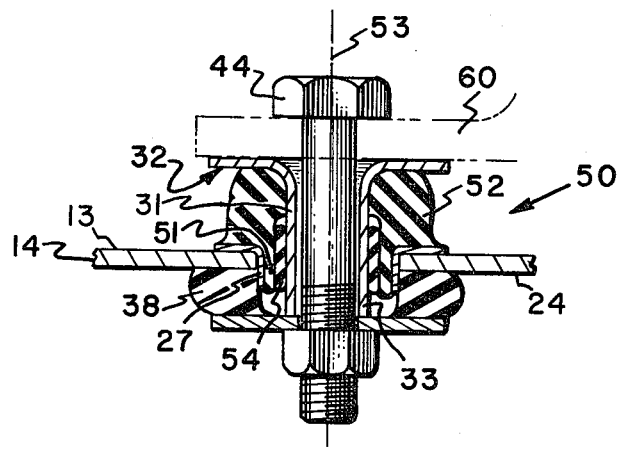
FIG. 4

RESILIENT MOUNTING

The foregoing abstract is not to be taken as limiting the invention of this application and in order to understand the full nature and extent of the technical disclosure of this application reference must be made to the accompanying drawings and to the following detailed description.

This invention relates to resilient mountings of the type which include first and second elastomeric insulators adapted for installation on opposite sides of the mounting surface and have a central bore extending through each of the insulators to receive a fastener such as a bolt which extends through the coaxially aligned bores of the mounting elements and surface.

The resilient mounting described herein is particularly useful for mounting of a small (for example, 5-10 h.p.) vertical crankshaft internal combustion engine such as is commonly used on lawn mowers and garden tractors. These engines may be of an unbalanced design and therefore transmit significant vibrations to their mounting points. One acceptable mounting and isolation system for such engines includes the use of a two-part elastomeric bushing having a first load-bearing elastomeric member positioned between the engine flange and the frame on which the engine is to be mounted and a second rebound elastomeric member positioned on the opposite side of the frame with a bolt extending through the coaxially aligned bores of the mounting flange of the engine, the elastomeric members and the vehicle frame. In this system restraint straps are required to restrain the engine from rotary motion during the firing stroke acceleration. These straps are typically of steel and are of an L-shaped configuration. At the junction of the two legs of the L, the restraint strap is fastened to the vehicle frame, and the ends of the restraint strap are fastened to the engine mounting flange, typically with the same bolts which pass through the isolation mountings. In this arrangement the steel restraint straps permit the vertical motion required for isolation and at the same time limit rotational excursion of the engine. In the absence of these restraint straps excessive engine movement may prevent acceptable power transmission to V-belts at the power take-off end of the engine crankshaft. Excessive engine excursion prevents maintenance of a tolerable alignment of the power take-off end of the engine with the remainder of the machinery to be driven by the engine.

It has been found that engine excursion can be limited by use of a resilient mounting according to the invention.

Referring to the drawings, in which like parts are numbered alike,

FIG. 1 is a cross-sectional view taken parallel to and through the axis of a resilient mounting according to the invention in its installed state;

FIG. 2 is a cross-sectional view taken parallel to and through the axis of the first insulator according to the embodiment illustrated in FIG. 1;

FIG. 3 is a cross-sectional view taken parallel to and through the axis of the second insulator in its undeformed state according to the embodiment illustrated in FIG. 1;

FIG. 4 is a cross-sectional view taken parallel to and through the axis of an alternate embodiment of a resilient mounting according to the invention in its installed state; and FIG. 5 is a plan view of a shoulder bolt useful in an embodiment of the invention.

Referring now to FIG. 1, there is shown a resilient mounting 10 according to the invention in its assembled and installed state or condition. The resilient mounting 10 includes a first annular insulator 12 of elastomeric material which may also be referred to as the load mount. The first insulator 12 is typically positioned on the upper side 13 of the vehicle or machine frame 14. As best illustrated in FIG. 2, the first insulator 12 in its undeformed state includes an upper portion 15 and a lower portion 16. The upper portion 15 of the first insulator 12 has a tapered outer wall 17 of greatest diameter adjacent the lower portion 16. The lower portion 16 of the first insulator 12 has a generally cylindrical outer wall 18. The overall diameter 19 of the upper portion 15 of the first insulator 12 is greater than that 20 of the lower portion. The first insulator 12 includes a central bore 22 extending axially therethrough, the diameter of the bore in the upper portion 15 being greater than that in the lower portion 16 with a conical transition zone 23 located between them.

A metallic annulus 26 typically formed of steel and having an L-shaped cross-sectional configuration is bonded to the first insulator 12. The metallic annulus 26 includes, when viewed in a plane parallel to and intersecting the longitudinal axis 11 of the resilient mounting 10, two legs which extend at a right angle to each other. The metallic annulus includes a tubular portion 27 which is joined at one end perpendicularly to the inner annular edge of a flat disc-like flange 28.

In the embodiments shown in FIGS. 1 and 2, the metallic annulus 26 is bonded to the lower end wall 21 of the upper portion 15 of the first insulator 12. The inner cylindrical wall of the tubular portion 27 of the metallic annulus 26 is bonded to the cylindrical outer wall 18 of the lower portion 16 of the first insulator 12.

The resilient mounting 10 includes a spacer 31 which is forcibly fitted into the first insulator 12. The spacer may be in the form of a spacer tube 32 and bolt 44 (FIGS. 1 and 4) or, alternatively, shoulder bolt 62 (FIG. 5).

The spacer tube 32 includes an elongated tubular portion 33 which is flared at one end into a flat disc-like flange 34 which extends at right angles to the axial direction of the tubular portion. Alternately, a common flat washer (not shown) may be substituted for flange 34.

In FIG. 1 the axial direction of the tubular portion 33 is parallel to axis 11. The tubular portion 33 of the spacer tube 32 has an outside diameter which is greater than the inside diameter or bore diameter of the lower portion 16 of the first insulator 12. Upon insertion of the spacer tube 32 into the first insulator 12, the elastomeric material of the lower portion 16 of the first insulator 12 is radially compressed between the tubular portions 33,27, respectively, of the spacer tube 32 and the metallic annulus 26. The degree of radial precompression should be at least 10 percent and preferably should be from about 15 to about 30 percent radial compression upon assembly of the spacer tube 32 into the first insulator 12. This is to insure that sufficient radial compression exists so that relaxation does not occur and thereby allow excessive excursion of the engine in a direction perpendicular to the axes of its resilient mountings.

Radial precompression of the lower portion of the first insulator may also be achieved through the use of a shoulder bolt 62 like that shown in FIG. 5 in place of spacer tube 32 and bolt 44 of FIGS. 1 and 4. Shoulder bolt 62 includes an axially elongated cylindrical shank 63 having a diameter greater than the bore diameter of the lower portion of the first insulator. As shown in FIGS. 1 and 5, the diameter of shank 63 is comparable to the outside diameter of the cylindrical tubular portion 33 of spacer tube 32. The threaded portion 64 of shoulder bolt 62 is of a lesser diameter than the shank 63. When shoulder bolt 62 is used in place of bolt 44 and spacer tube 33, the shoulder 65 serves to limit axial compression of the first and second insulators while the enlarged shank 63 causes radial precompression of the lower portion of the first insulator between the shank 63 and the tubular portion 27 of the metallic annulus 26.

A second annular insulator 38 of elastomeric material is positioned on the lower surface 24 of the vehicle frame 14. As clearly shown in FIG. 3, the second insulator 38 includes a central bore 39 extending axially therethrough. As shown in FIG. 1, the diameter of the bore 39 corresponds approximately to the outside diameter of the tubular portion 27 of the metallic annulus 26. A flat disc 40 having a central bore therethrough is coaxially aligned with and bonded to one axial end face 41 of the second insulator 38.

The mounting is utilized as follows. The spacer tube 32 is pre-assembled into the first insulator 12. The first insulator 12 having metallic annulus 26 bonded thereto is placed on the upper surface 13 of the vehicle frame 14. The second insulator 38 having flat disc 40 bonded thereto is placed on the opposite surface 24 of the vehicle frame 14 and in coaxial alignment with the first insulator 12 and spacer tube 32. A hole in the mounting flange 60 of the engine is placed over the spacer tube flange. A fastener such as a bolt 44 is positioned so that it extends axially through the coaxially aligned parts as illustrated in FIG. 1 and the first and second insulators 12,38, respectively, are drawn axially toward one another thereby placing the elastomer of each in axial compression. The degree of axial compression is predetermined by the axial dimensions of the first and second rubber insulators and the axial dimension of the spacer tube. The amount of axial compression recommended for a mounting according to the invention is no different than that recommended for similarly appearing mountings which do not employ radial precompression of the lower portion of the first insulator. These values, being openly known and available to those skilled in the art, will not be described further as they are not a part of the present invention.

In a preferred embodiment, insulators of resilient mountings according to the invention are molded of compounded chloroprene elastomer, although other elastomers well known to those skilled in the art of resilient elastomeric mountings may be employed.

In preferred embodiments the hardness or durometer as measured on the Shore A scale of the lower portion of the first insulator exceeds that of the second insulator by ten (10) or more points. In a particularly preferred embodiment like that illustrated in FIG. 1, the lower portion of the first insulator has a Shore A hardness of about seventy (70) and the second insulator has a Shore A hardness of about fifty (50).

In FIG. 4, there is illustrated another embodiment of a resilient mounting 50 according to the invention. Mounting 50 has an axis 53. The mounting 50 is similar to that illustrated in FIG. 1 with the exception that the lower portion 51 of the first insulator 52 includes a separately molded cylindrical sleeve 54 of elastomeric material. In an embodiment like that shown in FIG. 4, the majority of the first insulator 52 may be formed of elastomeric material having a Shore A hardness comparable to that of the second insulator 38 and the sleeve 54 preferably has a Shore A hardness which exceeds that of the second insulator 38 as described hereinabove. As in the embodiment illustrated in FIG. 1, the elastomeric material of the lower portion 51 of the first insulator 52 of the embodiment shown in FIG. 4 is radially compressed between the tubular portions 33,27, respectively of the spacer tube 32 and the metallic annulus 26.

The term "axially", whenever used in the accompanying abstract, specification and claims, unless otherwise defined, means in the direction of or parallel to the direction of the axis of the respective mounting or part thereof.

The term "radially", whenever used in the accompanying abstract, specification and claims, unless otherwise defined, means in a direction perpendicular to and intersecting the axis of the mounting or part thereof.

While certain representative embodiments and details have been shown for the purpose of illustrating the invention, it will be apparent to those skilled in the art that various changes and modifications may be made therein without departing from the spirit or scope of the invention.

What is claimed is:

1. A resilient mounting comprising:
   (a) a spacer including an elongated cylindrical portion;
   (b) an annular first insulator of elastomeric material including an upper and lower portion and having a central bore extending axially through said upper and lower portions, the upper portion including a generally cylindrical inner wall and a generally planar lower end wall, the lower portion including generally cylindrical outer and inner walls, the overall diameter of the upper portion being greater than that of the lower portion, the diameter of the bore in the upper portion being greater than the diameter of the bore in the lower portion;
   (c) a metallic annulus including a tubular portion joined at one end to the inner annular edge of a perpendicularly extending flat disc having a central bore therethrough, the flat disc of said metallic annulus being bonded to the lower end wall of the upper portion of the first insulator, the tubular portion of the metallic annulus being bonded to the outer cylindrical wall of the lower portion;
   (d) a second insulator of elastomeric material of a generally cylindrical configuration having a central bore extending axially therethrough, said bore diameter corresponding approximately to the outside diameter of the tubular portion of the metallic annulus;
   (e) a flat disc having a central bore therethrough coaxially aligned with and bonded to one axial end face of said second rubber insulator;
   (f) the cylindrical portion of said spacer having an outside diameter greater than the bore diameter of the lower portion of the first insulator, said cylindrical portion adapted to be forcibly fitted into the bore of said first insulator thereby radially compressing the lower portion of said first insulator between the cylindrical portion of said spacer and the tubular portion of said metallic annulus at least 10 percent;

(g) said first and second insulators adapted to be drawn axially toward one another thereby placing the elastomeric material of said first and second insulators in axial compression during installation of the mount, the amount of axial compression being limited to a predetermined amount by the respective overall axial dimensions of the spacer and undeformed insulators.

2. The mounting of claim 1 in which the lower and upper portions of the first insulator are integrally molded to one another.

3. The mounting of claim 1, wherein the spacer includes an elongated tubular portion and at one end a flat disc-like flange extending perpendicularly of the longitudinal axis of the tubular portion.

4. The mounting of claim 1, 2, or 3, wherein the lower portion of the first insulator is radially compressed from about 15 to about 30 percent upon forcibly fitting the tubular portion into the bore of the first insulator.

5. The mounting of claim 1, 2, or 3, wherein the hardness of the first insulator exceeds that of the second insulator by 10 or more points on the Shore A scale.

6. The mounting of claim 1, 2, or 3, wherein the first insulator has a hardness of about 70 Shore A and the second insulator has a hardness of about 50 Shore A.

7. The mounting of claim 4, wherein the hardness of at least a part of the lower portion of the first insulator exceeds that of the second insulator by 10 or more points on the Shore A scale.

8. The mounting of claim 4, wherein at least a part of the lower portion of the first insulator has a hardness of about 70 Shore A and the second insulator has a hardness of about 50 Shore A.

* * * * *